Patented July 2, 1935

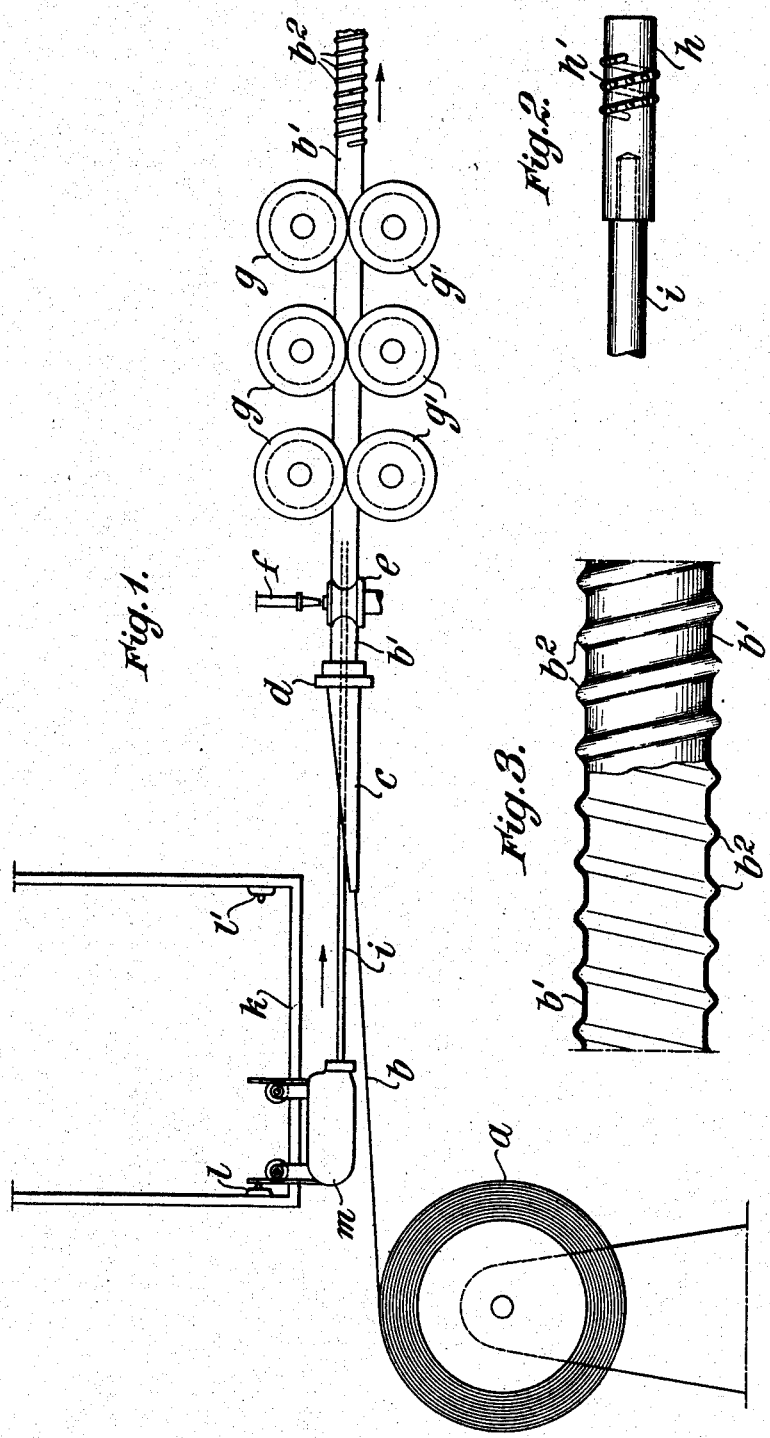

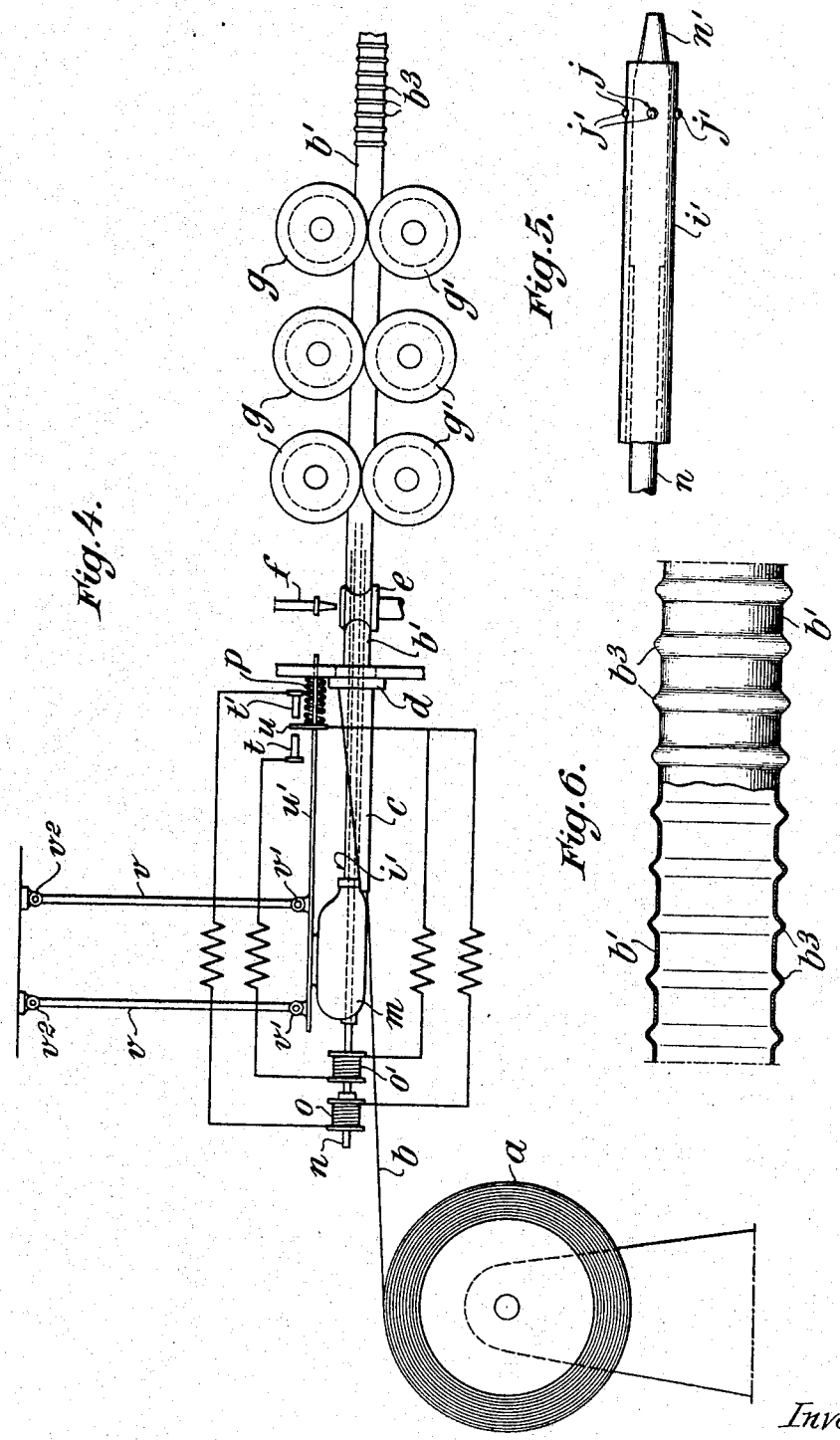

2,007,149

UNITED STATES PATENT OFFICE 2,007,149

MEANS FOR PRODUCING FLEXIBLE TUBES

Albert Dreyer, Lucerne, Switzerland

Application August 21, 1933, Serial No. 686,131
In Germany January 28, 1933

12 Claims. (Cl. 113—33)

This invention relates to means for producing flexible tubes from metal strip by rounding the strip transversely with respect to its longitudinal direction, welding the slotted or open tube thus formed and making helical or annular corrugations in the tube wall.

The novelty of the invention consists substantially in that the corrugations in the walls of the tube are made immediately following the welding, that is to say, on the welding machine itself, so that the metal strip is converted into a flexible tube in one continuous operation.

Preferably a known welding machine is used to effect the rounding of the metal strip into a slotted or open tube, its autogenous or electric welding and the finishing calibration; but this known machine is, in accordance with the invention, provided with a tool which is carried a certain distance with the tube on the latter being fed forward during the welding and is set in rotation or effective rotation automatically to produce the required corrugations in the welded tube.

Preferably the corrugating tool is arranged to be rotated, through a shaft of suitable length, from an electric motor disposed on the entrance side of the strip to the machine, this motor being slidably mounted.

For making helical corrugations a threaded tool may be used and the motor arranged to slide between two switches for switching it "on" and "off" in such manner that as the tube in course of production is fed forward the tool and motor are carried therewith until the motor reaches the "on" switch whereby the tool is set in rotation and screwed backwards in the tube until the motor reaches the "off" switch, this cycle being automatically repeated.

For making annular corrugations a mandrel may extend through the tool drive shaft (which is made hollow) and mechanical or electrical means may be provided for reciprocating and controlling the mandrel in such manner that its forward movement spreads out pressure means (balls or equivalent) carried by the tool to produce a corrugation during the rotation of the tool, while opposite movement of the mandrel results in contraction of the said pressure means so that the return movement of the tool and driving motor, which were advanced during the corrugating operation, may be effected as by spring means.

In the accompanying drawings and by way of example two constructional forms of the means for carrying out the invention are shown as applied to autogenous butt welding machines.

Fig. 1 shows the arrangement for producing helical corrugations, Fig. 2 shows the threaded corrugating tool used and Fig. 3 is a view of a finished corrugated tube partly in section.

Figs. 4 to 6 show in similar representation the arrangement for producing annular corrugations, the corrugating tool used and a corrugated tube.

Referring to Fig. 1, $a$ is a reel wherefrom metal strip $b$ is led to a rounding funnel $c$ (or rounding rolls or the like) whence it passes through a calibrating drawing die $d$ which produces a slotted or open tube $b^1$. Guide rollers for the lateral guiding of the tube are indicated at $e$, a welding burner is indicated at $f$, and $g$, $g^1$ denote calibrating rollers by means of which the welded tube is fed forward.

In accordance with the invention the tube is provided with corrugations immediately after having left the calibrating rollers, whereby the smooth and rigid tube is converted into an easily flexible tube, such as are employed in electrical installation work. The corrugation of the tube is effected by means of a supplementary tool and a shaft for driving the tool, the said shaft when very long tubes are produced being driven from the feed side of the metal strip.

The shaft may be driven through the welding machine (for example by positive drive from the calibrating and feed rollers thereof) or a belt drive or individual drive (for example a small electric motor) may be provided. In the example hereinafter described the last mentioned method of driving is embodied.

Referring to Fig. 2, $h$ is the tool for producing helical corrugations in the tube $b^1$, Fig. 1, $i$ is the driving shaft which may be rigid or flexible, and $m$ is the electric motor for driving said shaft, the said motor being preferably slidably disposed on a rail $k$. $l$ and $l^1$ are press button switches, such as are employed for example in lifts.

The tool $h$, which in itself is known, is provided with a screw thread $h^1$, Fig. 2, having a pitch corresponding to the desired pitch of the corrugations of the tube. For reducing frictional resistance the screw thread is provided on its periphery with steel balls.

Prior to commencing the corrugation of the welded tube the motor $m$ is set in the initial position shown in Fig. 1, and the tool $h$ (which is detachable) is screwed to the extent of a few convolutions into the open end of the tube and on to the end of the shaft $i$.

When the machine is started up and the welded tube $b^1$ is fed forward, the tool $h$ and therewith the shaft $i$ and the motor $m$ (not switched on) are also carried in the direction of the arrow. The motor slides along the rail $k$ until it is switched on through hitting the press button $l^1$ whereupon the tool $h$ is rotated and screwed backwards into the smooth tube $b^1$, the motor $m$ then sliding back along the rail $k$ until it strikes the press button $l$, which thereby switches it off. As the welded tube continues its forward movement it pulls the threaded tool $h$ together with the shaft $i$ and motor $m$ again forward towards the press button $l^1$, so that the corrugating operation starts afresh.

The number of revolutions of the motor $m$ and therewith of the shaft $i$ and the tool $h$ is such that in the same time interval a greater length of tube can be corrugated than welded, that is to say the output of the corrugating means must be greater than that of the welding machine because the latter does not operate with a continuously uniform speed.

By the means described a tube $b^1$ with helical corrugations $b^2$, Figs. 1 and 3, is produced, which may be made to suit actual requirements as to diameter and length and which, due to its flexibility, may be wound on a reel behind the machine.

For producing closed annular corrugations in the tube $b^1$ the arrangement may be as shown in Fig. 4.

Here again $a$ is a reel wherefrom metal strip $b$ is led to a rounding funnel $c$ whence it passes to a calibrating drawing die $d$ from which a slotted or open tube $b^1$ emerges. $e$ are lateral rollers for guiding the slotted tube $b^1$, $f$ a welding burner, and $g$, $g^1$ are calibrating rollers which feed the welded tube forward.

In order that the tool for producing the annular corrugations may be withdrawn from a corrugation after completion of same and then displaced to form the next corrugation, the diameter of the pressure means of the tool must be suitably reduced. For this purpose the tool may be constructed after the manner of the so-called tensioning pliers or a similar tool. As shown in Fig. 5, the tool comprises a tube $i^1$ forming a prolongation of the hollow shaft of the motor $m$ and provided near its end with a plurality of holes $j$ wherein are fitted steel balls $j^1$. These balls may be pushed outwards in well known manner by means of an inner mandrel $n$ tapered at $n^1$ whereby they penetrate into the tube and form a corrugation when the shaft $i^1$ is rotated. At the retraction of the mandrel $n$ the balls are again withdrawn into the interior. The mandrel may be reciprocated by mechanical or electrical means. In the arrangement shown in Fig. 4 the mandrel, which passes through the full length of the hollow motor shaft $i^1$, is made magnetic and is reciprocated by two electromagnets $o$ and $o^1$.

As a corrugation is produced the corrugating tool and therewith the hollow shaft $i^1$ and the motor $m$ are pulled forward due to the forward feed of the tube. For this purpose the whole driving and switching mechanism of the corrugating means is suspended at $v^1$, $v^2$ upon two links $v$, $v$. During the said forward movement a spring $p$ is compressed until a contact plate $u$ disposed on a rod $u^1$ secured to the motor touches a contact member $t^1$, whereby the circuit of the electromagnet $o$ is closed and retracts the mandrel $n$, the balls $j^1$ being thereby withdrawn from the corrugation $b^3$ just formed. In this manner the tool is freed from the corrugation and the spring $p$ which is now compressed moves the motor back into its initial position, whereby contact is made between the plate $u$ and a second contact screw $t$ and the circuit of the electromagnet $o^1$ is closed. The latter pushes the conical mandrel $n$ forward and thereby again presses the balls $j^1$ of the corrugating tool outwards so that a further corrugation is formed as the motor and tool rotate. The cycle of operations is automatically repeated.

The distance apart of the corrugations may be varied at will by adjusting the terminal stops, that is to say the contact screws $t$, $t^1$.

Fig. 6 shows a tube $b^1$ having annular corrugations $b^3$ produced by the means last described. This tube may be manufactured to suit actual requirements as regards dimensions and may be of any desired length, and due to its flexibility it may be wound upon a reel behind the machine.

I claim:—

1. Means for producing flexible tubes from metal strip, comprising the combination with a continuous welding machine, having means for rounding the metal into an axially slotted tube and means for welding the edges of such tube together, of a rotatable corrugating tool longitudinally displaceable in the axis of the tube and mechanism for rotating the tool to effect circumferential corrugation of the wall of the welded tube.

2. Means for producing flexible tubing from metal strip, comprising the combination with a continuous welding machine, having means for rounding the strip into an axially slotted tube and means for welding the edges of such tube together, of an expansible corrugating tool, and means for displacing, for expanding and for rotating the tool to effect annular corrugations at regular space-intervals in the wall of the welded tube.

3. Means as claimed in claim 1, said mechanism comprising an electric motor having a drive shaft extending in said axis, means supporting the motor on the entrance side of the welding machine and affording displacement of the motor in said axis between limits, a current circuit for the motor, two electric switches in the circuit located one at each of said limits, the switches being respectively operable by the motor when displaced to close the circuit and to open the circuit, and said corrugating tool being mounted on said drive shaft and having helically disposed projecting means engageable with the interior of the welded tube to displace the motor and thereby to operate the circuit-closing switch and cause the motor to rotate and screw the tool backwards with the drive shaft, helically corrugating the tube and displacing the motor to operate the circuit-opening switch.

4. Means as claimed in claim 1, said mechanism and said corrugating tool jointly comprising a continuously running electric motor having an extended hollow drive shaft, a mandrel extending through the shaft, a taper portion on the mandrel, pressure means disposed in the shaft in a plane transverse to the axis of the shaft and outwardly displaceable by axial movement of the taper portion to engage and corrugate the tube annularly, means supporting the motor on the entrance side of the welding machine, a spring associated with said means, said means and said spring affording displacement of the motor with the drive shaft axially between limits in one direction under engagement of the pressure means with the tube and in the other direction under the action of the spring, and means for reciprocating the mandrel within the hollow drive shaft.

5. Means as claimed in claim 1, said mechanism comprising a continuously running electric motor, a drive shaft extending in said axis, a clutch between the motor and the shaft, means supporting the motor and the shaft on the entrance side of the welding machine and affording displacement of the motor and the shaft in said axis between limits, two trip means located one at each of said limits, striker means displaceable with the shaft, the trip means being respectively operable by the striker means when displaced to engage the clutch and to disengage the clutch, and said corrugating tool being mounted on said drive shaft and having helically disposed projecting means engageable with the interior of the welded tube to displace the motor and thereby to operate the clutch-engaging trip means and cause the shaft to be rotated and screw the tool and itself backwards, helically corrugating the tube and displacing the striker means to operate the clutch-disengaging trip means.

6. Means as claimed in claim 1, said mechanism and said corrugating tool jointly comprising a continuously running electric motor having an extended hollow drive shaft, a mandrel extending through the shaft, a taper portion on the mandrel, pressure means disposed in the shaft in a plane transverse to the axis of the shaft and outwardly displaceable by axial movement of the taper portion to engage and corrugate the tube annularly, means supporting the motor on the entrance side of the welding machine, a spring associated with said means, said means and said spring affording displacement of the motor with the drive shaft axially between limits in one direction under engagement of the pressure means with the tube and in the other direction under the action of the spring, two electromagnets mounted with the motor, armatures for the electromagnets associated with the mandrel for movement relative to the motor and the electromagnets, an energizing circuit for each of the electromagnets, a fixed contact in each of the circuits, and a movable contact in both circuits displaceable with the motor to close one or the other of the circuits and move the mandrel axially within the shaft.

7. Means as claimed in claim 1, said mechanism and said corrugating tool jointly comprising a continuously running electric motor having an extended hollow drive shaft, a mandrel extending through the shaft, a taper portion on the mandrel, pressure means disposed in the shaft in a plane transverse to the axis of the shaft and outwardly displaceable by relative axial movement of the taper portion to engage and corrugate the tube annularly, means supporting the motor on the entrance side of the welding machine, a spring associated with said means, said means and said spring affording displacement of the motor with the drive shaft and the mandrel axially between limits in one direction under engagement of the pressure means with the tube and in the other direction under the action of the spring, two electromagnets mounted with the motor, armatures for the electromagnets associated with the mandrel for movement relative to the motor and the electromagnets, an energizing circuit for each of the electromagnets, a fixed contact in each of the circuits, and a movable contact in both circuits displaceable with the motor to close one or the other of the circuits and move the mandrel axially within the shaft, the fixed contacts being adjustable as regards their distance apart in the path of displacement of the movable contact.

8. Means as claimed in claim 1, said mechanism comprising a continuously running electric motor, a drive shaft extending in said axis, an electromagnetic clutch between the motor and the shaft, means supporting the motor and the shaft on the entrance side of the welding machine and affording displacement of the shaft in said axis between limits, a current circuit for the clutch, two electric switches in the circuit located one at each of said limits, striker means displaceable with the shaft, the switches being respectively operable by the striker means when displaced to close the circuit and to open the circuit, and said corrugating tool being mounted on said drive shaft and having helically disposed projecting means engageable with the interior of the welded tube to displace the tool and the shaft and thereby to operate the circuit-closing switch and cause the motor to rotate the shaft and screw the tool backwards with the shaft, helically corrugating the tube and displacing the striker means to operate the circuit-opening switch.

9. Means for producing flexible tubes from metal strip, comprising the combination with a continuous welding machine, having means for rounding the metal into an axially slotted tube, means for welding the edges of such tube together, and feeding and calibrating rollers for the metal, of a rotatable corrugating tool longitudinally displaceable in the axis of the tube and mechanism for rotating the tool to effect circumferential corrugation of the wall of the welded tube, said mechanism comprising an electric motor having a drive shaft extending in said axis, means supporting the motor on the entrance side of the welding machine and affording displacement of the motor in said axis between limits, a current circuit for the motor, two electric switches in the circuit located one at each of said limits, the switches being respectively operable by the motor when displaced to close the circuit and to open the circuit, and said corrugating tool being mounted on said drive shaft and having helically disposed projecting means engageable with the interior of the welded tube to displace the motor and thereby to operate the circuit-closing switch and cause the motor to rotate and screw the tool backwards with the drive shaft, helically corrugating the tube and displacing the motor to operate the circuit-opening switch.

10. Means for producing flexible tubes from metal strip, comprising the combination with a continuous welding machine, having means for rounding the metal into an axially slotted tube, means for welding the edges of such tube together, and feeding and calibrating rollers for the metal, of a rotatable corrugating tool longitudinally displaceable in the axis of the tube and mechanism for rotating the tool to effect circumferential corrugation of the wall of the welded tube, said tool and said mechanism jointly comprising a continuously running electric motor having an extended hollow drive shaft, a mandrel extending through the shaft, a taper portion on the mandrel, pressure means disposed in the shaft in a plane transverse to the axis of the shaft and outwardly displaceable by axial movement of the taper portion to engage and corrugate the tube annularly, means supporting the motor on the entrance side of the welding machine, a spring associated with said means, said means and said spring affording displacement of the motor with the drive shaft axially between limits in one direction under engagement of the pressure means with the tube and in the other direction under the action of the spring, and means for reciprocating the mandrel within the hollow drive shaft.

11. Means for producing flexible tubes from metal strip, comprising the combination with a continuous welding machine, having means for rounding the metal into an axially slotted tube, means for welding the edges of such tube together, and feeding and calibrating rollers for the metal, of a rotatable corrugating tool longitudinally displaceable in the axis of the tube and mechanism for rotating the tool to effect circumferential corrugation of the wall of the welded tube, said mechanism comprising a drive shaft extending in said axis, a positive drive connection between said rollers and the shaft, said connection including a clutch, means supporting the shaft on the entrance side of the welding machine, and affording displacement of the shaft in said axis between limits, engaging means for the clutch and disengaging means for the clutch located respectively at each of said limits, said means being respectively operable on displacement of the shaft, and said corrugating tool being mounted on said shaft and having helically disposed projecting means engageable with the interior of the welded tube to displace the shaft and thereby to operate the clutch-engaging means and cause the shaft to be rotated and screw the tool and itself backwards, helically corrugating the tube and subsequently operating the clutch-disengaging means.

12. Means for producing flexible tubes from metal strip, comprising the combination with a continuous welding machine, having means for rounding the metal into an axially slotted tube, means for welding the edges of such tube together, and feeding and calibrating rollers for the metal, of a rotatable corrugating tool longitudinally displaceable in the axis of the tube and mechanism for rotating the tool to effect circumferential corrugation of the wall of the welded tube, said mechanism comprising a hollow drive shaft, a positive drive connection between said rollers and the shaft, a mandrel extending through the shaft, a taper portion on the mandrel, pressure means disposed in the shaft in a plane transverse to the axis of the shaft and outwardly displaceable by axial movement of the taper portion to engage and corrugate the tube annularly, means supporting the shaft on the entrance side of the welding machine, a spring associated with said means, said means and said spring affording displacement of the shaft axially between limits in one direction under engagement of the pressure means with the tube and in the other direction under the action of the spring, and means for reciprocating the mandrel within the hollow drive shaft.

ALBERT DREYER.